S. G. ANDERSON.
Automatic Cut-Off Valve for Water Tanks, &c.
No. 201,979. Patented April 2, 1878.
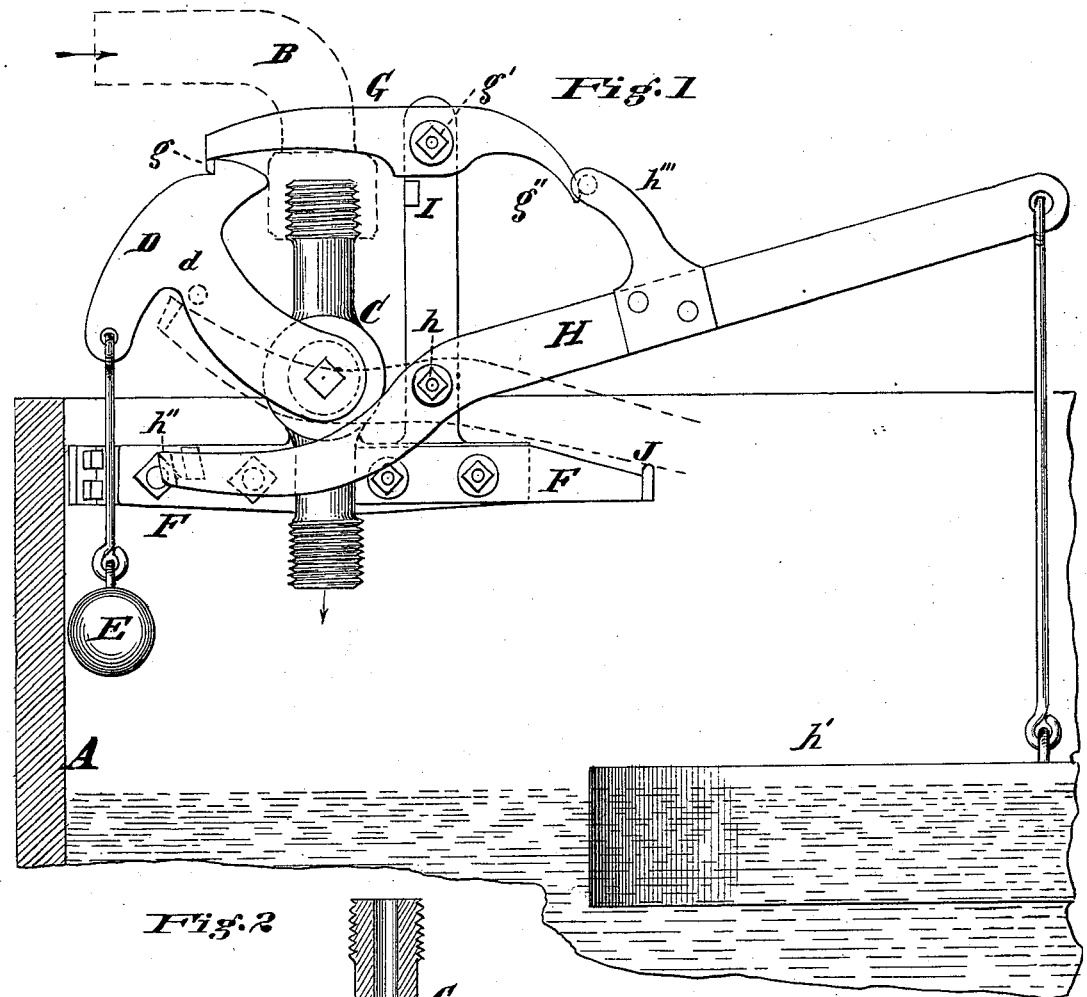
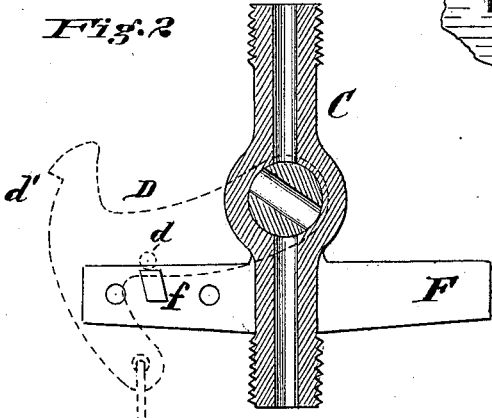
Attest
Edgar J. Knox
John E. Jones.
Inventor
Saml G. Anderson
By F. Millward
Attorney

UNITED STATES PATENT OFFICE.

SAMUEL G. ANDERSON, OF CINCINNATI, OHIO.

IMPROVEMENT IN AUTOMATIC CUT-OFF VALVES FOR WATER-TANKS, &c.

Specification forming part of Letters Patent No. 201,979, dated April 2, 1878; application filed November 26, 1877.

*To all whom it may concern:*

Be it known that I, SAMUEL G. ANDERSON, of Cincinnati, Hamilton county, State of Ohio, have invented an Improvement in Automatic Cut-Off Valves for Water-Tanks, &c., of which the following is a specification:

My invention is designed to operate the supply-valves of water-tanks automatically in a more certain and effective manner than has been done heretofore; and my invention consists in a certain combination of gravitating valve-lever, actuating float-lever, and gravitating-dog, by which the valve is kept open so long as water is required, and instantly closed when the water has reached the required level in the tank.

In the accompanying drawings, forming part of this specification, Figure 1 is a section of a portion of a tank, showing my valve-operating device attached and in the open position; and Fig. 2 is a view of the valve and its gravitating-lever in the closed position.

A is the tank; B, the supply-pipe, and C the valve or cock. To the plug of the cock I secure a lever, D, which, when released from the open position, acts by its own gravity to close the cock. To render this action more positive a weight, E, may be added. A bracket, F, from the tank supports the cock and its operating appliances, and the projecting pin $d$ of the lever D (when the lever is down) rests for the support of the lever upon the projecting lip $f$ from the bracket. The lever D has a notch, $d'$, at its upper side, into which the lip $g$ of a gravitating-dog, G, engages by gravity when the lever is up. The dog pivots at $g'$ on the bracket F, and has an arm, $g''$, upon which the float-lever acts to trip the dog and cause the cock to close. H is the float-lever, which is pivoted at $h$ on the bracket, and carries a float, $h'$, at one end, also a projecting lip, $h''$, at the other end, to engage under the lever D and lift it, as shown by dotted lines. The lever H has a tripping-arm, $h'''$, to act on the top of the arm $g''$, as shown, the end being preferably armed with an anti-friction roller. A projection, I, prevents the dog G from falling too low, and the projection J from the bracket supports the float-lever when it is in its lowest position.

Operation: In Fig. 1 the valve or cock is in the open position, and it is kept open against the gravitating action of lever D by the dog G. The water is shown as risen so as to partly immerse the float, and the float-lever is in the act of tripping the dog. As the water rises higher the tripping-arm of the float-lever trips the dog, and the lever D, by its gravitating action, shuts the cock. When the water again falls, by drawing off or otherwise, so as to let the float fall, the float-lever projection $h''$ engages under the lever D, and lifts it again into an engagement with the dog G, to open the cock and retain it in the open position.

I claim—

The combination of gravitating valve-lever D, gravitating-dog G, and float-lever H, connected with and operating to open and close valve C, substantially as and for the purpose specified.

In testimony of which invention I hereunto set my hand.

SAMUEL G. ANDERSON.

Witnesses:
EDGAR J. GROSS,
JOHN E. JONES.